Aug. 4, 1953     E. M. KELLY     2,647,869
CLARIFICATION

Filed Nov. 3, 1949     2 Sheets-Sheet 1

INVENTOR.
EARL M. KELLY,
BY
ATTORNEY.

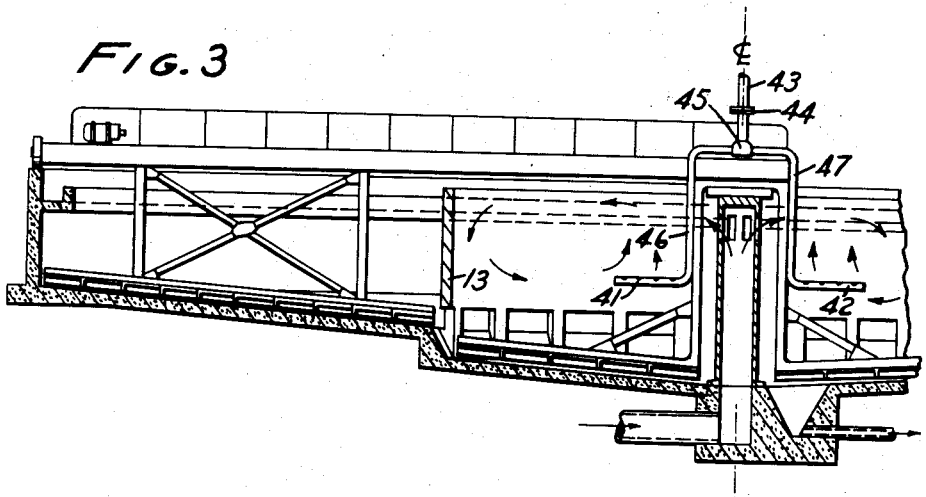

Patented Aug. 4, 1953

2,647,869

UNITED STATES PATENT OFFICE 2,647,869

CLARIFICATION

Earl M. Kelly, Millbrae, Calif., assignor to Process Engineers Incorporated, a corporation of California Application November 3, 1949, Serial No. 125,227

2 Claims. (Cl. 210—3)

This invention is concerned with clarification and provides improvements in clarifiers, especially those employed in sewage treatment.

This in a continuation-in-part of my copending application Serial No. 648,111, filed February 16, 1946, now Patent No. 2,506,927.

As disclosed in my co-pending application, it is desirable to aerate sewage while it is undergoing clarification. This tends to satisfy the biological oxygen demand (B. O. D.) of the sewage and may also increase settlement rate by raising or recirculating settled sludge into the upper portion of the pool in which settlement occurs. The sludge particles appear to act as nuclei to produce flocculation of finely divided solids. Whatever the explanation, the aeration of the pool to cause upward recirculation increases settlement rate.

Preferably a clarifier in which aeration is conducted comprises a tank adapted to contain the liquid (say raw sewage) to be clarified. The liquid is introduced into a central zone in the tank. Aeration is conducted in the central zone, the air being introduced at a level above the tank bottom so that it bubbles upward and and causes sludge to be buoyed upward by the bubbles. Settlement occurs in the lower portion of the central zone and also in the outer annular zone which surrounds the cental zone. Sludge settling to the bottom of both zones is raked to discharge. Clarified liquid overflows from the upper portion of the outer annular zone, for example, into a peripheral launder.

It is desirable to separate the inner and outer zones from each other, so as to localize aeration and permit settlement to proceed in relatively quiescent liquid in the outer annular zone. At the same time, it is desirable to remove sludge settling to the bottom of both zones at a single point, say in a sludge pit disposed on the bottom near the center of the inner or central zone. This may be accomplished by employing a raking mechanism extending along the bottom from the central discharge point to the periphery of the tank and mounting an annular baffle on the raking mechanism and extending upward above the liquid level in the tank. The raking mechanism rotates about a central axis and scrapes sludge in spiral paths from the periphery of the tank along the bottom to the central discharge point. In such case, the baffle rotates with the raking mechanism. This requires a strong and consequently heavy rake mechanism and also increases power consumption, since the baffle as well as the rakes must be moved. It is also possible to suspend the baffle from above, for example, from beams laid across the tank. In such case the baffle is stationary and since it is not carried by the raking mechanism, the latter may be of lighter construction. However, in large installations, i. e. when the tanks are of great diameter, the beams or trusses required to support the baffle are of great length and weight, again increasing construction cost.

I have developed a more satisfactory solution to the problem. In the structure of my invention the annular baffle which separates the outer annular or sedimentation zone from the inner or agitation zone is supported from the bottom on a plurality of piers or supports spaced from each other so as to leave ports between them adjacent the tank bottom. The raking means is made in two sections, one of which extends along the bottom from the tank periphery to the bottom and rakes sediment from the bottom of the annular or sedimentation compartment to the ports, through which the sediment moves to the bottom of the central compartment. The second rake section extends from the baffle to the sediment discharge near the center of the inner or agitation compartment and rakes sediment, including that passing through the ports, over the bottom of the inner compartment to the sediment discharge. Both sections of the raking mechanism rotate about a common central axis.

Thus, in accordance with the invention, the baffle is stationary and if desired may be formed integrally with the tank in the form of a cylindrical concrete wall. Heavy beams or trusses across the top of the tank are not required, and at the same time the rake mechanism can be of light weight construction, since it does not support the baffle.

Preferably the bottom of the tank immediately below the baffle is sloped steeply toward the inner compartment, so as to facilitate gravity flow of sediment or sludge from the outer to the inner compartment through the ports under the baffle. This is particularly desirable when the baffle is of substantial thickness, as is the case when it is cast of concrete.

The rake mechanism may be constructed in various ways. Thus it may take the form of an arm rotatable about a central joint just above the tank and carried around by a traction device mounted on the outer end of the arm and riding on a peripheral track at the top of the tank, with the rake sections proper suspended from the arm by vertical members. In a small structure, the arm may be driven from the center, instead of by the traction device at the periphery. In still another and preferred modification, the outer rake section is supported from the arm, which is carried around the tank by the peripheral traction arrangement, while the inner section is fastened rigidly to the lower portion of a central cage or column which is connected to the arm so that it rotates within the inner compartment.

These and other aspects of my invention will be understood thoroughly in the light of the following detailed description, taken in conjunction with the accompanying single figure, in which:

Fig. 3 is a fragmentary elevation (partly in section) of another form of the clarifier of my invention.

Figure 1:
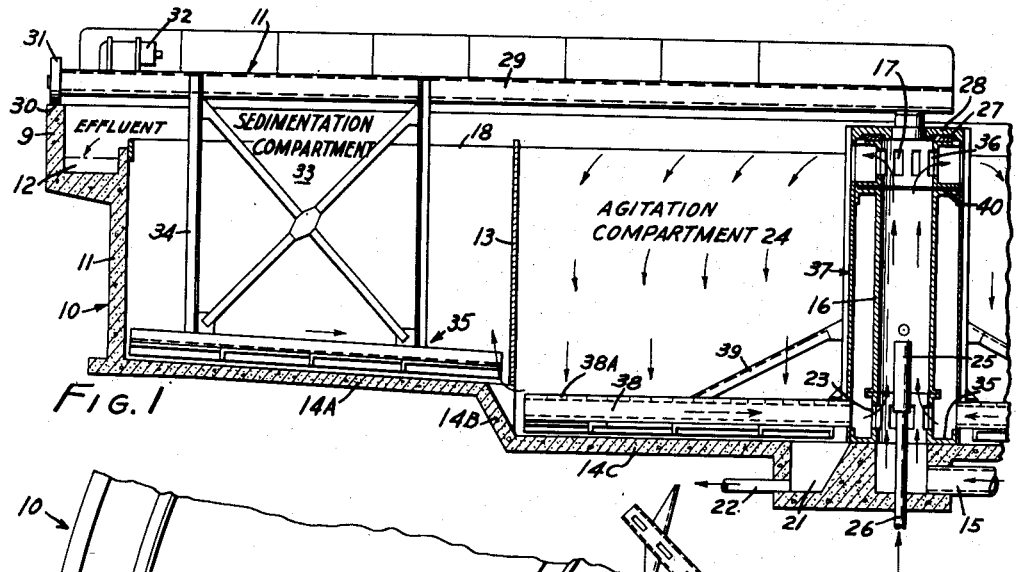
Fig. 1 is a fragmentary vertical elevation, partly in section, of one form of the apparatus of the invention.
Figure 2:
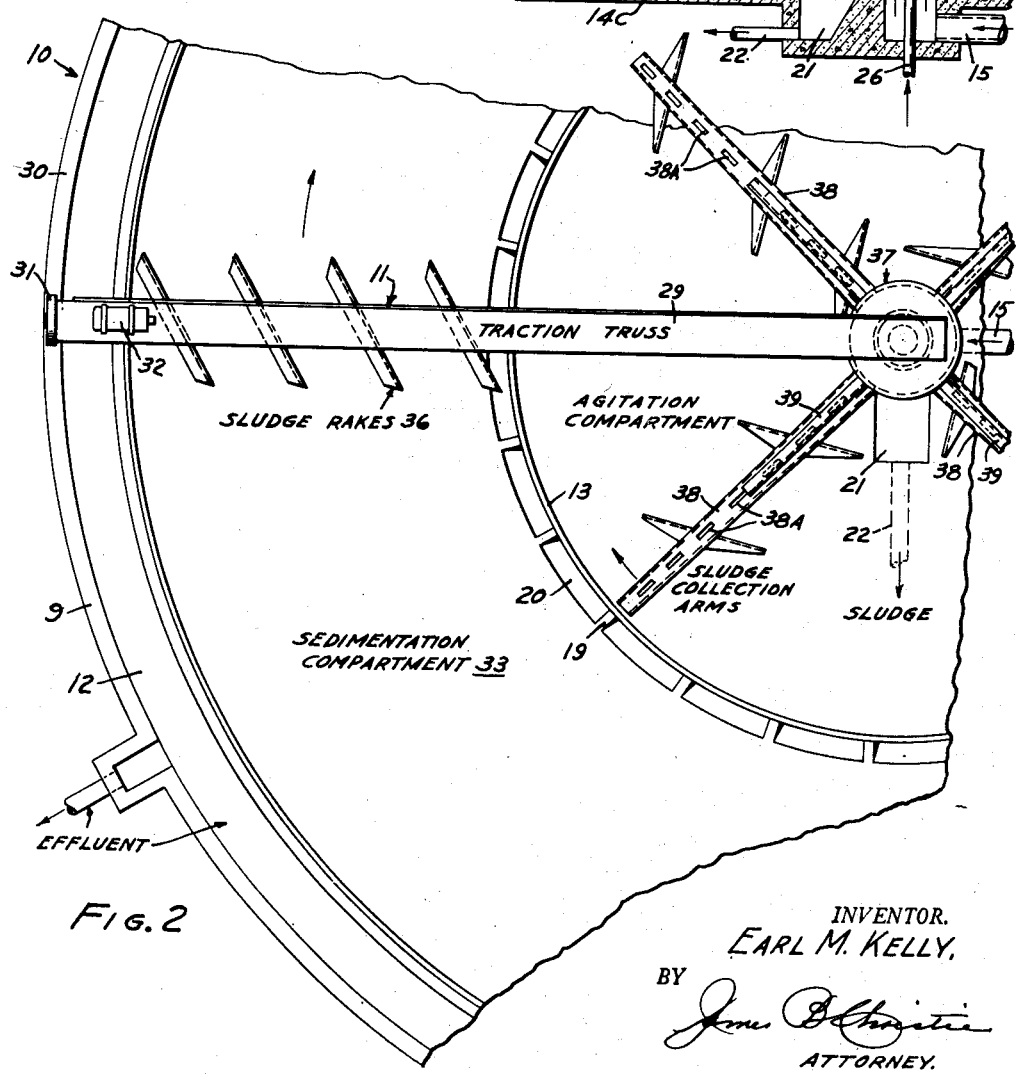
Fig. 2 is a fragmentary plan of the apparatus of Fig. 1.

The apparatus of Figs. 1 and 2 comprises a relatively shallow tank 10 of large diameter having a vertical side wall 11 with a peripheral launder 12 around its top. Beginning at the bottom of the tank wall, the tank bottom slopes slightly toward the center. Near a vertical annular baffle 13, the bottom slopes sharply to the center and on the other side of the baffle the bottom has little or no slope toward the center. In short, the tank bottom is composed of three portions 14A, 14B, 14C joined together. The outer portion is an inverted frusto-conical section with a slight slope; the intermediate portion is an inverted frusto-conical section with a steep slope; and the inner portion may be flat or an inverted frusto-conical section with a slight slope.

A liquid suspension, say raw sewage to be clarified, enters the bottom of the tank through a feed pipe 15 and rises upward in an upright hollow center column 16 or well with which the feed pipe is connected. Ports 17 near the top of the column are provided for discharging the feed into the tank at about the level 18 of a pool retained in the tank.

The baffle is a cylindrical plate and extends almost to the tank bottom and to a level above that of the liquid in the tank. It is supported on a plurality of radial piers 19 which rest on the steeply sloping portion 14B of the tank bottom. These piers are spaced from each other so as to leave a series of radial ports 20 between them.

Near the central column of the tank in the innermost bottom section is a sludge pit 21 from which sludge or other sediment is removed through a pipe 22.

The central column is provided with a series of lower ports 23 disposed adjacent the tank bottom and communicating with the agitation or inner compartment 24, which is inside the annular baffle. Disposed above these inlet ports is an air diffuser 25 fed with air under pressure by an upwardly projecting air pipe 26 disposed on the upright axis of the tank and the column. The air diffuser and the column act as an airlift. Settled sludge is drawn in through the lower ports and discharged with the raw sewage and the air through the upper ports.

The central column is stationary and has a bearing 27 on its upper end which supports a turntable 28. This turntable is rigidly attached to and supports the inner end of a traction truss 29 that extends radially across the tank to a track 30 formed by the outside wall of the peripheral launder. A traction wheel 31 is mounted on the truss and rides around on the track, being driven by a motor 32 mounted adjacent the wheel on the truss.

The space between the outer tank wall and the baffle serves as a sedimentation compartment 33.

From the traction truss a framework 34 extends downwardly and is provided with a rigidly attached rake arm 35 which extends radially just above the tank bottom and is provided with rakes 36 which cause sediment setting on the tank bottom to be pushed in spiral paths toward the baffle and into the ports beneath the baffle.

A skeleton framework or cage 37 is mounted rigidly on the turntable and extends downwardly around the column. This cage carries four radial arms 38 adjacent the tank bottom in the agitation compartment and extending from the baffle almost to the center column. The rake arms on the cage are supported by angle braces 39 and have rakes which move sediment, including that passing from the sedimentation compartment, in spiral paths to and into the sludge pit.

Both sections of the raking mechanism are turned by the traction device at the outside end of the traction truss.

If desired, the rake arms in the agitation compartment may be hollow and provided with a series of slots 38A on their upper sides, through which settled sludge flows toward the lower ports of the center column.

In the operation of the apparatus just described, the raw sewage or other feed, together with returned settled sludge is aerated and lifted by the air introduced at the diffuser and carried out the upper ports of the central column into the pool in the agitation compartment. Settlement as well as agitation occurs in this compartment and some of the sediment or sludge is recirculated through the column. The recirculation of this partially settled sludge aids coagulation and flocculation of solids in the sewage and the aeration also aids such coagulation and fluocculation and at the same time serves to satisfy the biological oxygen demand of the sewage.

Liquid from the agitation compartment passes into the sedimentation compartment through the ports underneath the baffle counter-current to and above sludge or sediment settled out in the sedimentation compartment. Clarified liquid overflows at the periphery of the sedimentation compartment into the launder and is removed as effluent.

The apparatus of Fig. 3 is, in general, similar to that of Figs. 1 and 2. It differs, however, in the following respects:

The annular baffle 13 is of concrete rather than steel and is of substantial thickness, making it all the more desirable to have a steep slope to the bottom immediately under the baffle, since the distance that the sediment must flow (without the aid of rakes from the sedimentation compartment to the agitation compartment) is somewhat greater.

There are no lower ports in the central column or well through which the feed enters the agitation compartment, and the air diffuser is not disposed in the central column. Instead, agitation and aeration are brought about by a plurality of perforated pipes 41, 42 fastened to the cage and projecting radially into the agitation compartment at a substantial distance above the rake arms. Air to be diffused or dispersed in the contents of the agitation compartment is fed under pressure from a vertical pipe 43 disposed above the tank on the axis of rotation of the truss, through a swivel joint 44 to a vertical header 45 connected to the perforated pipes or diffusers by branch lines 46, 47. The diffusers rotate with the truss, cage and rakes and cause an upward circulation of the contents of the agitation compartment near the cage. Circulation in the loops indicated by the arrows in the agitation compartment is thus established. The air tends to supply the biological oxygen demand of the sewage undergoing treatment at the same time that aerated floc is brought into contact with the sewage, thus increasing flocculation and sedimentation and increasing settling rate and increasing the proportion of material removed from the sewage.

I claim:

1. In a clarifier including a tank adapted to contain a pool of liquid to be clarified, a sediment discharge means in the bottom of the tank near its center, and a liquid discharge means at its upper periphery, the combination which comprises raking means extending just above the bottom of the tank and rotatable about a substantially central axis so as to rake sediment along the tank bottom into the discharge means, a relatively thick annular baffle in the tank with its center corresponding substantially to the axis of the raking means and extending from a level slightly above the tank bottom to a level above that of the pool of liquid in the tank and dividing the tank into an inner compartment and an outer annular compartment, a plurality of supports disposed between the baffle and the bottom for holding the baffle above the bottom, the supports being relatively narrow and spaced from each other so as to leave relatively wide, thick ports between them at the bottom and open about a large proportion of the periphery of the baffle so as to permit the passage under the baffle of solids from the outer compartment to the inner compartment and the counter-current passage of liquid from the inner compartment to the outer compartment and the bottom being sloped steeply toward the inner compartment immediately underneath the baffle throughout its thickness so as to facilitate movement of the sediment from the outer compartment to the inner compartment and the raking means being made in two sections, one of which extends from the tank periphery to the baffle and rakes sediment from the bottom of the annular compartment to the ports, through which the sediment moves to the bottom of the inner compartment, and the second of which extends from the baffle to the sediment discharge means and rakes sediment, including that passing through the ports, over the bottom of the central compartment to the sediment discharge means, and means for introducing the liquid to be clarified into the inner compartment.

2. In a clarifier including a tank adapted to contain a pool of liquid to be clarified, a sediment discharge means in the bottom of the tank near its center, and a liquid discharge means at its upper periphery, the combination which comprises raking means extending just above the bottom of the tank and rotatable about a substantially central axis so as to rake sediment along the tank bottom into the discharge means, a relatively thick annular baffle in the tank with its center corresponding substantially to the axis of the raking means and extending from a level slightly above the tank bottom to a level above that of the pool of liquid in the tank and dividing the tank into an inner compartment and an outer annular compartment, a plurality of supports disposed between the baffle and the bottom for holding the baffle above the bottom, the supports being relatively narrow and spaced from each other so as to leave relatively wide thick ports between them at the bottom and open about a large proportion of the periphery of the baffle so as to permit the passage under the baffle of solids from the outer compartment to the inner compartment and the counter-current passage of liquid from the inner compartment to the outer compartment and the bottom being sloped steeply toward the inner compartment immediately underneath the baffle throughout its thickness so as to facilitate movement of the sediment from the outer compartment to the inner compartment but being relatively flat in both compartments and the raking means being made in two sections, one of which extends from the tank periphery to the baffle and rakes sediment from the bottom of the annular compartment to the ports, through which the sediment moves to the bottom of the inner compartment, and the second of which extends from the baffle to the sediment discharge means and rakes sediment, including that passing through the ports, over the bottom of the central compartment to the sediment discharge means, and means for introducing the liquid to be clarified into the inner compartment.

EARL M. KELLY.

References Cited in the file of this patent

UNITED STATES PATENTS

| Number | Name | Date |
|---|---|---|
| 2,233,792 | Mallory | Mar. 4, 1941 |
| 2,289,112 | Fischer | July 7, 1942 |
| 2,291,772 | Talbot et al. | Aug. 4, 1942 |
| 2,506,927 | Kelly | May 9, 1950 |